United States Patent
Kurosawa (10) Patent No.: US 10,442,248 B2
(45) Date of Patent: Oct. 15, 2019

(54) TIRE

(71) Applicant: Sumitomo Rubber Industries, Ltd., Kobe-shi, Hyogo (JP)

(72) Inventor: Dai Kurosawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 322 days.

(21) Appl. No.: 15/385,439

(22) Filed: Dec. 20, 2016

(65) Prior Publication Data

US 2017/0197473 A1    Jul. 13, 2017

(30) Foreign Application Priority Data

Jan. 8, 2016  (JP) ................. 2016-002982

(51) Int. Cl.
*B60C 11/03* (2006.01)
*B60C 11/04* (2006.01)

(52) U.S. Cl.
CPC .......... *B60C 11/0306* (2013.01); *B60C 11/04* (2013.01); *B60C 2011/0346* (2013.01);
(Continued)

(58) Field of Classification Search
CPC ............ B60C 11/0306; B60C 11/04; B60C 2011/0372; B60C 2011/0381; B60C 2011/0383; B60C 2011/0346; B60C 2011/0358; B60C 2011/0365; B60C 2011/0353; B60C 11/11
(Continued)

(56) References Cited

U.S. PATENT DOCUMENTS

2012/0267022 A1   10/2012  Tagashira
2013/0068360 A1*   3/2013  Tannugi .............. B60C 11/0306
                                                    152/209.18
(Continued)

FOREIGN PATENT DOCUMENTS

DE          3445041      *  6/1986
JP       2012-224245 A     11/2012
JP       2014-180910      *  9/2014

OTHER PUBLICATIONS

JP 2014-180910, English language machine translation [epo.org]. (Year: 2014).*

*Primary Examiner* — Eric Hug
(74) *Attorney, Agent, or Firm* — Birch, Stewart, Kolasch & Birch, LLP (57) ABSTRACT

A tire 1 has a tread portion 2 provided with: pair of axially innermost circumferentially continuously extending crown main grooves 3; outward transverse grooves 8 extending axially outwardly therefrom; and inward transverse grooves 9 extends axially inwardly extending therefrom. The crown main groove 3 is a zigzag groove comprising axially outer segments 15 and axially inner segments 16 extending in the tire circumferential direction, and oblique segments 17 connecting between the segments 15 and 16. The inward transverse grooves 9 are connected to axially inner intersections 18 at which the axially inner segments 16 intersect with the oblique segments 17. The outward transverse grooves 8 are connected to axially outer intersections 19 at which the axially outer segments 15 intersect with the oblique segments 17.

8 Claims, 8 Drawing Sheets (52) U.S. Cl.
CPC ............. *B60C 2011/0358* (2013.01); *B60C 2011/0365* (2013.01); *B60C 2011/0372* (2013.01); *B60C 2011/0381* (2013.01); *B60C 2011/0383* (2013.01)

(58) Field of Classification Search
USPC ..................................................... 152/209.1
See application file for complete search history.

(56) References Cited

U.S. PATENT DOCUMENTS

| | | | |
|---|---|---|---|
| 2014/0048191 A1* | 2/2014 | Renis ................ | B60C 11/0306 152/209.24 |
| 2014/0238567 A1* | 8/2014 | Iwasaki .............. | B60C 11/0306 152/209.18 |
| 2015/0059941 A1* | 3/2015 | Niwa ................. | B60C 11/0083 152/209.14 |
| 2015/0165825 A1* | 6/2015 | Kobayashi .......... | B60C 11/0306 152/209.21 |

* cited by examiner

TIRE

TECHNICAL FIELD

The present invention relates to a tire having excellent on-the-snow performance.

BACKGROUND ART

A tire used on snowy roads is provided in the tread portion with a plurality of main grooves continuously extending in the tire circumferential direction, and a plurality of transverse grooves extending in the tire axial direction so as to exert on-the-snow performances such as on-the-snow traction performance and on-the-snow lateral grip performance. The on-the-snow traction performance (driving force on snowy roads) is brought about shearing force of the snow packed into the transverse grooves. The on-the-snow lateral grip performance (running stability when turning a steering wheel during running on snowy roads) is brought about frictional force caused by the circumferential component of the edges of the main grooves. To improve such on-the-snow performances is an everlasting problem for the tires used on snowy roads.

SUMMARY OF THE INVENTION

It is therefore, a primary object of the present invention to provide a tire having excellent on-the-snow performances.

According to the present invention, a tire comprises
a tread portion provided with main grooves including a pair of axially innermost crown main grooves extending continuously in the tire circumferential direction, a plurality of outward transverse grooves extending axially outwardly from the crown main grooves, and a plurality of inward transverse grooves extending axially inwardly from the crown main grooves,
the crown main groove is a zigzag groove comprising
a plurality of axially outer segments extending along the tire circumferential direction,
a plurality of axially inner segments extending along the tire circumferential direction on the axially inner side of the axially outer segments, and
a plurality of oblique segments inclined with respect to the tire circumferential direction and linking the axially outer segments and the axially inner segments,
each of the inward transverse grooves is connected to one of axially inner intersections of the axially inner segments and the oblique segments, and
each of the outward transverse grooves is connected to one of axially outer intersections of the axially outer segments and the oblique segments.

In the tire according to the present invention, it is preferable that the inward transverse grooves are smoothly connected to the respective oblique segments.

In the tire according to the present invention, it is preferable that the number of the inward transverse grooves is smaller than the number of the axially outer segments.

In the tire according to the present invention, it is preferable that the inward transverse grooves extend straight.

In the tire according to the present invention, it is preferable that the outward transverse groove comprises
an axially inner portion connected to the crown main groove, and
an axially outer portion located axially outside the axially inner portion, and
the groove width of the axially inner portion is more than the groove width of the axially outer portion.

In the tire according to the present invention, it is preferable that the outward transverse grooves are inclined oppositely to the inward transverse grooves, and
the intersecting angle of the outward transverse groove and the inward transverse grooves is in a range from 100 to 130 degrees.

In the tire according to the present invention, it is preferable that the angle of the inward transverse groove with respect to the tire axial direction is less than the angle of the outward transverse groove with respect to the tire axial direction.

DESCRIPTION OF THE PREFERRED EMBODIMENTS

Embodiments of the present invention will now be described in detail in conjunction with the accompanying drawings.

The present invention can be applied to various tires including pneumatic tires such as passenger car tires and heavy duty tires as well as non-pneumatic tires not having a cavity to be pressurized.

Figure 1:
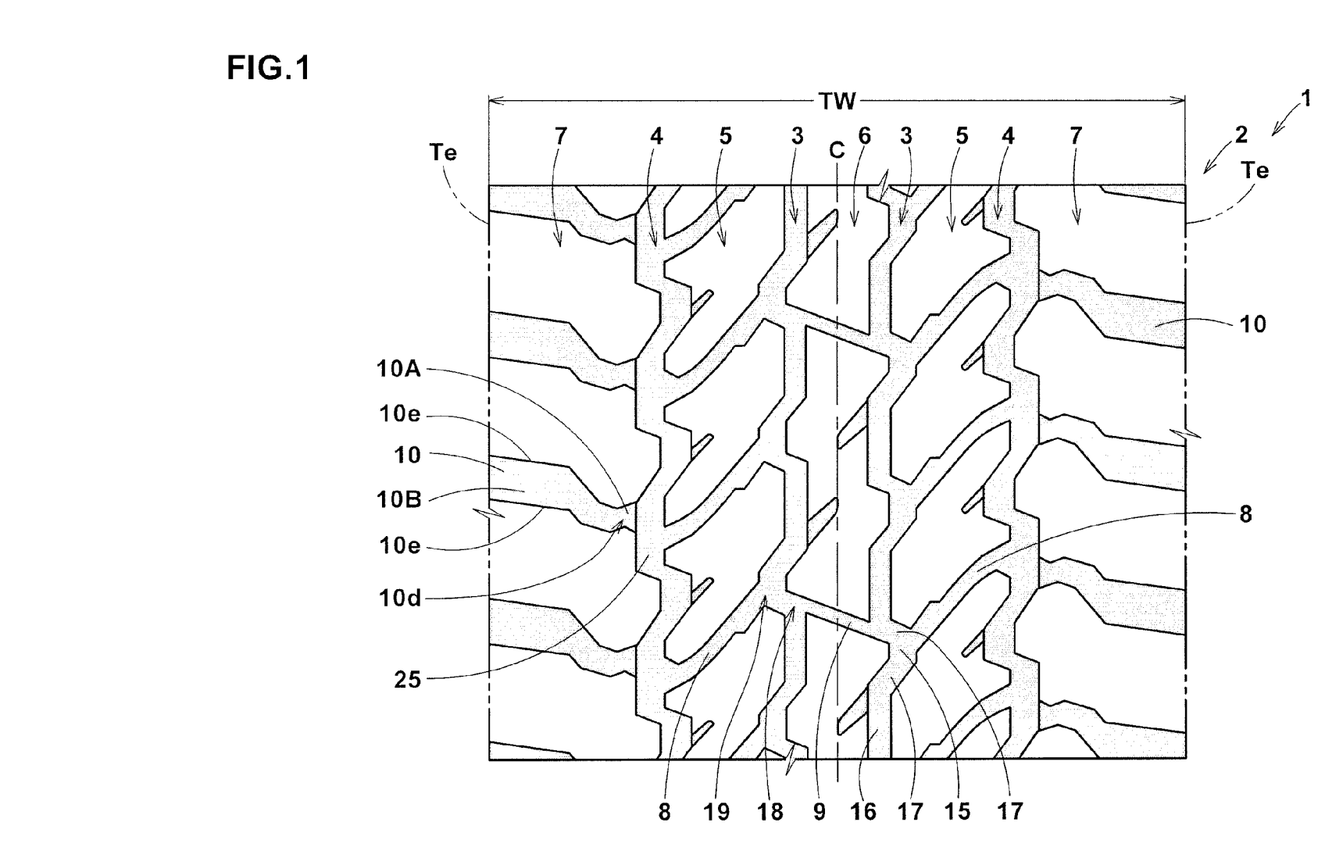
FIG. 1 is a developed view of the tread portion of a tire as an embodiment of the present invention.

FIG. 1 shows a tread portion 2 of a tire 1 as an embodiment of the present invention which is a pneumatic tire for passenger cars.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

As shown in FIG. 1, the tire 1 is provided in the tread portion 2 with main grooves extending continuously in the tire circumferential direction. The main grooves include a pair of shoulder main grooves 4 and a pair of axially innermost crown main grooves 3 therebetween.

Figure 2:
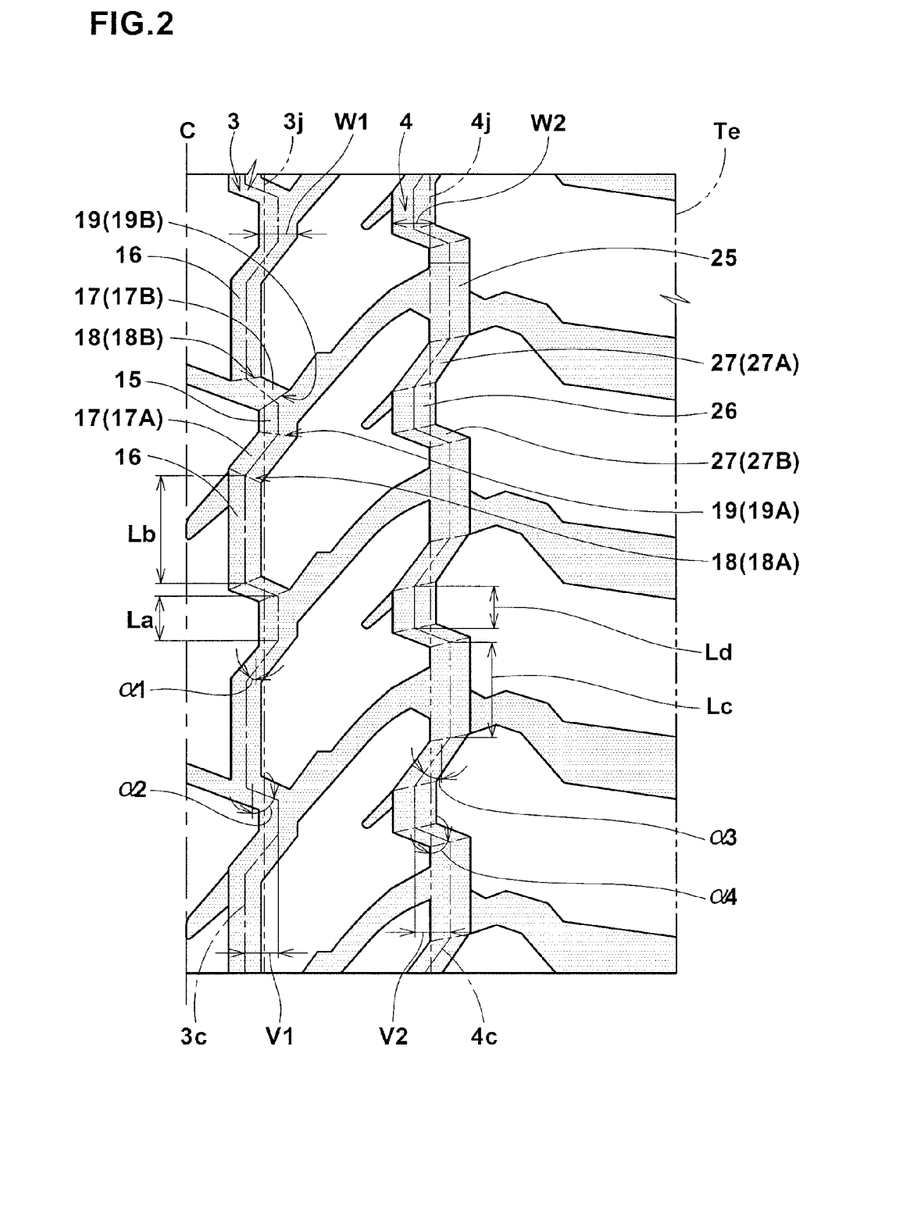
FIG. 2 is a closeup of FIG. 1 showing the crown main groove and a shoulder main groove.

As shown in FIG. 2, each of the crown main grooves 3 is a zigzag groove comprising alternately arranged axially outer segments 15 and axially inner segments 16 as well as oblique segments 17 connecting therebetween.

The axially outer segments 15 and the axially inner segments 16 each extend along the tire circumferential direction so that the circumferential component of the groove edges becomes maximum to exert a large frictional force and thereby on-the-snow lateral grip performance is improved.

In this embodiment, the axially outer segments 15 and the axially inner segments 16 each extend straight. Thereby, the above-mentioned function is effectively exerted.

In this specification, the expression "a groove extends along the tire circumferential direction" means that the angle of the widthwise center line of the groove with respect to the tire circumferential direction is not more than 5 degrees.

In this embodiment, the length Lb in the tire circumferential direction of the axially inner segment 16 is more than the length La in the tire circumferential direction of the axially outer segment 15.

Thereby, in a land region on the tire-equator-c-side of the crown main groove 3 which is subjected to a relatively high ground pressure, the difference between a volume of a land region near the axially outer segments 15 and a volume of a land region near the axially inner segments 16, and the rigidity variation of the land region is reduced, therefore the uneven wear resistance can be improved.

If the circumferential length Lb of the axially inner segment 16 is excessively larger than the circumferential length La of the axially outer segments 15, the rigidity variation of the land region increases, and there is a possibility that the uneven wear resistance is deteriorated.

Therefore, it is preferable that the length Lb of the axially inner segment 16 is set in a range of from 1.5 to 3.5 times the length La of the axially outer segment 15.

The oblique segments 17 connect between the axially outer segments 15 and the axially inner segments 16 and are inclined with respect to the tire circumferential direction. Such oblique segment 17 has an axial component, and increases the shearing force of compacted snow to improve on-the-snow traction performance. Further, the edges of the oblique segment 17 have a circumferential component, and cause a frictional force to improve the lateral grip performance.

Thus, the oblique segments 17 can improve the lateral grip performance and the traction performance on the snowy roads. In this embodiment, the oblique segments 17 each extend straight.

The oblique segments 17 include
first oblique segments 17A inclined with respect to the tire circumferential direction to one axial direction (in FIG. 2, slope down to the left), and
second oblique segments 17B inclined with respect to the tire circumferential direction oppositely to the first oblique segments 17A (in FIG. 2, slope down to the right), and
the first oblique segments 17A and the second oblique segments 17B are alternate in the tire circumferential direction.

In this embodiment, the angle $\alpha 1$ of the first oblique segment 17A with respect to the tire circumferential direction is different from the angle $\alpha 2$ of the second oblique segment 17B with respect to the tire circumferential direction.

The first oblique segments 17A have a smaller angle with respect to the tire circumferential direction and have a larger edges' circumferential component, and
the second oblique segments 17B have a larger angle with respect to the tire circumferential direction and increase the shearing force of compacted snow.

Thus, the traction performance and the lateral grip performance on the snowy roads can be improved in a good balance.

In order to effectively derive such function, it is preferred that the difference between the angle $\alpha 1$ of the first oblique segment 17A and the angle $\alpha 2$ of the second oblique segment 17B is in a range from 10 to 30 degrees.

By the axially outer segments 15, the axially inner segments 16 and the oblique segments 17, the crown main groove 3 is provided with axially inner intersections 18 at which the axially inner segments 16 intersect with the oblique segments 17, and axially outer intersections 19 at which the axially outer segments 15 intersect with the oblique segments 17.

In this embodiment, the axially inner intersections 18 include first axially inner intersections 18A at which the first oblique segments 17A intersect with the axially inner segments 16, and second axially inner intersections 18B at which the second oblique segments 17B intersect with the axially inner segments 16.

Further, the axially outer intersections 19 include first axially outer intersections 19A at which the first oblique segments 17A intersect with the axially outer segments 15, and second axially outer intersections 19B at which the second oblique segments 17B intersect with the axially outer segments 15.

It is preferable that the peak-to-peak amplitude V1 of zigzag of the crown main groove 3 is 80% to 100% of the maximum groove width W1 of the crown main groove 3.

In this specification, the peak-to-peak amplitude V1 is of the widthwise center line 3c of the crown main groove 3. If the amplitude V1 of the crown main groove 3 is less than 80% of the maximum groove width W1 of the crown main groove 3, there is a possibility that on-the-snow traction performance is decreased.

If the amplitude V1 of the crown main groove 3 is more than 100% of the maximum groove width W1 of the crown main groove 3, as the rigidity of the land region is decreased near the oblique segments 17 of the crown main grooves 3, there is a possibility that uneven wear resistance is deteriorated.

It is preferable that the center line $3j$ of the amplitude V1 of zigzag of the crown main groove 3 is positioned at an axial distance of from 5% to 10% of the tread width TW from the tire equator c.

If more than 10% of the tread width TW, the ground pressure at the oblique segments 17 is decreased, and there is a possibility that the shearing force of compacted snow is decreased.

If less than 5%, the difference in the rigidity between a land region on the axially inside of the crown main groove 3 and a land region on the axially outside of the crown main groove 3 is increased, and there is a possibility that the uneven wear resistance is deteriorated.

It is preferable that the maximum groove width W1 of the crown main groove 3 is 3% to 8% of the tread width TW. Thereby, the rigidity of the land regions adjacent to the crown main grooves 3 can be maintained, while obtaining the shearing force of compacted snow by the oblique segments 17. Further, it is preferable that the groove depth of the crown main grooves 3 is about 10 to 12 mm for example.

In this embodiment, each of the shoulder main grooves 4 comprises alternately arranged axially outer segments 25 and axially inner segments 26 as well as oblique segments 27 therebetween and is formed in the form of a zigzag.

The axially outer segments 25 and the axially inner segments 26 each extend along the tire circumferential direction. such axially outer segments 25 and axially inner segments 26 cause frictional force by their edges' circumferential component, and improve on-the-on-the-snow lateral grip performance. In this embodiment, the axially outer segments 25 and the axially inner segments 26 each extends straight. Thereby, the above-mentioned function is effectively exerted.

In the shoulder main grooves in this embodiment, the length Lc in the tire circumferential direction of the axially outer segment 25 is more than the length Ld in the tire circumferential direction of the axially inner segment 26. Thereby, the edges of the axially outer segments 25 located on the tread-edge-Te-side on which a larger lateral force acts can generate a larger frictional force by the edges' circumferential component, and thereby on-the-snow lateral grip performance is improved.

If the circumferential length Lc of the axially outer segment 25 of the shoulder main groove 4 is excessively large, the difference in the rigidity between a land region near the axially outer segments 25 and a land region near the axially inner segments 26 increases, and there is a possibility that the uneven wear resistance is deteriorated.

Therefore, it is preferable that the length Lc of the axially outer segment 25 is set in a range of from 1.5 to 3.5 times the length Ld of the axially inner segment 26.

The oblique segments 27 are inclined with respect to the tire circumferential direction and connect between the axially outer segments 25 and the axially inner segments 26 of the shoulder main groove 4.

Such oblique segment 27 has an axial component, and can improve on-the-snow traction performance.

Further, the edges of the oblique segment 27 have a circumferential component, and cause a frictional force to improve the lateral grip performance on the snowy roads. Therefore, the oblique segments 27 can improve the lateral grip performance and traction performance on the snowy roads.

The oblique segments 27 include
third oblique segments 27A inclined with respect to the tire circumferential direction to one axial direction (in FIG. 2, slope down to the left), and
fourth oblique segments 27B inclined with respect to the tire circumferential direction oppositely to the third oblique segments 27A (in FIG. 2, slope down to the right).

The third oblique segments 27A and the fourth oblique segments 27B alternate in the tire circumferential direction.

In this embodiment, the angle $\alpha 3$ of the third oblique segment 27A with respect to the tire circumferential direction is different from the angle $\alpha 4$ of the fourth oblique segment 27B with respect to the tire circumferential direction. The angle $\alpha 3$ is smaller than the angle $\alpha 4$.

The edges of the third oblique segments 27A have a larger circumferential component, and the fourth oblique segments 27B derive a larger shearing force of compacted snow.

Thus, the lateral grip performance and traction performance on the snowy roars can be further improved in a good balance by providing the oblique segments 27A and 27B with the different angles $\alpha 3$ and $\alpha 4$.

In order to effectively derive such function, it is preferred that the difference between the angle $\alpha 3$ and the angle $\alpha 4$ is in a range from 10 to 30 degrees.

It is preferable that the ratio V2/W2 of the peak-to-peak amplitude V2 of zigzag of the shoulder main groove 4 to the maximum groove width W2 of the shoulder main groove 4 is less than the ratio V1/W1 of the peak-to-peak amplitude V1 of zigzag of the crown main groove 3 to the maximum groove width W1 of the crown main groove 3.

Thus, the zigzag shoulder main grooves 4 is more linear than the zigzag crown main grooves 3. Thereby, the frictional force by the edge's circumferential component is effectively derived from the edge of the shoulder main groove 4 which edge is on the tread-edge-Te-side on which a larger lateral force acts, and on-the-on-the-snow lateral grip performance can be further improved. If the ratio V2/W2 is excessively smaller than the ratio V1/W1, the axial component of the shoulder main groove 4 is decreased, and there is a possibility that the shearing force of compacted snow is decreased.

From this standpoint, it is preferred that the peak-to-peak amplitude V2 of zigzag of the shoulder main groove 4 is set in a range from 70% to 90% of the maximum groove width W2 of the shoulder main groove 4.

In this specification, the amplitude V2 of the shoulder main groove 4 is of the widthwise center line $4c$ thereof.

The center line $4j$ of the amplitude of zigzag of the shoulder main groove 4 is positioned at a distance in a range from 22.5% to 27.5% of the tread width TW from the tire equator C. Thereby, the land regions on both sides of the shoulder main groove 4 can secure axial rigidity in a good balance.

It is not essential but preferable that the maximum groove width W2 of the shoulder main grooves 4 is in a range from 3.5% to 10.0% of the tread width TW, and that the groove depth of the shoulder main grooves 4 is about 10 to 12 mm.

In this embodiment, as shown in FIG. 1, the tread portion 2 is axially divided into one center land portion 6 between the crown main grooves 3, a pair of middle land portions 5 between the crown main grooves 3 and shoulder main grooves 4, and a pair of shoulder land regions 7 between the shoulder land regions 7 and the tread edges Te.

Figure 3:
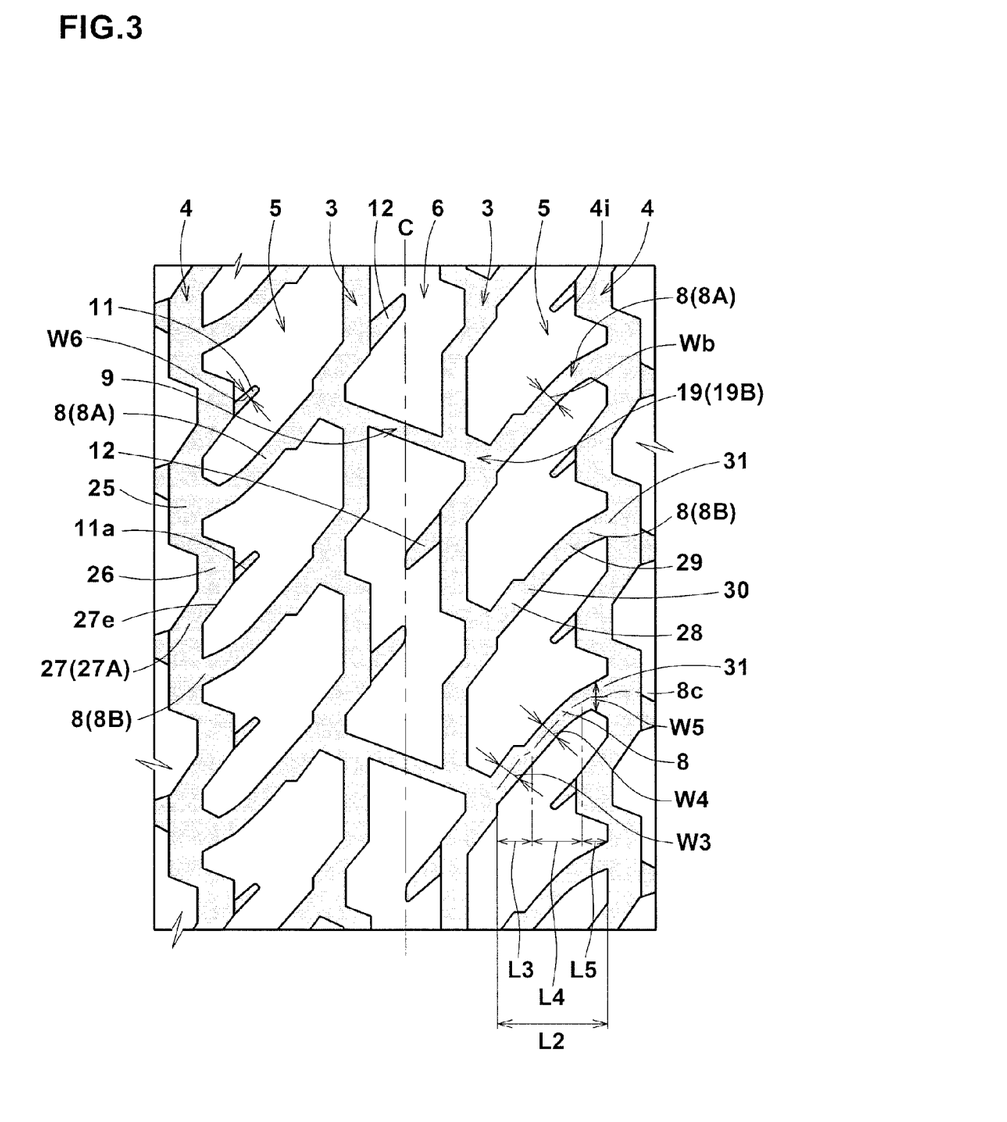
FIG. 3 and FIG. 4 are a closeup of FIG. 1 showing a center land portion and middle land portions.

Each of the middle land portions 5 is as shown in FIG. 3 provided with
a plurality of outward transverse grooves 8 extending axially outwardly from the crown main groove 3, and a plurality of middle rug grooves 11 extending axially inwardly from the shoulder main groove 4.

such outward transverse grooves 8 and middle rug grooves 11 each have an axial component, and improve on-the-snow traction performance.

In this embodiment, the outward transverse grooves 8 are respectively connected to the axially outer intersections 19 of the crown main groove 3.

Thereby, the rigidity of the middle land portions 5 in the vicinities of the axially outer intersections 19 can be maintained, and stiffly compacted snow can be formed by the axially outer intersections 19 and the outward transverse grooves 8. Accordingly, on-the-snow traction performance can be further improved.

In this embodiment, the outward transverse grooves 8 are connected to the second axially outer intersections 19B.

In this embodiment, the outward transverse groove 8 comprises an axially inner portion 28 connected to the crown main groove 3, and an axially outer portion 29 extending axially outwardly from the axially inner portion 28.

The groove width W3 of the axially inner portion 28 is more than the groove width W4 of the axially outer portion 29.

Thus, as the axially inner portion 28 having a wider groove width is located on the tire-equator-c-side on which a higher ground pressure acts, it can increase the shearing force of compacted snow.

As the axially outer portion 29 having a smaller groove width is disposed in an axially outside of the middle land portion 5, the decrease in the rigidity of the middle land portion 5 is suppressed, and the uneven wear resistance is maintained at high level.

In order to effectively derive such function, it is preferred that the groove width W3 of the axially inner portion 28 is set in a range from 1.4 to 1.6 times the groove width W4 of the axially outer portion 29.

In this specification, the groove width of each of the axially inner portion 28 and axially outer portion 29 is defined by a distance measured perpendicularly to the groove center line 8c of the outward transverse groove 8 between the groove edges of the outward transverse groove 8 and averaged over the length thereof.

The groove center line 8c is a line sequentially connecting intermediate positions in the tire circumferential direction between the groove edges of the outward transverse groove 8.

In this embodiment, the axially inner portion 28 has a widening part 30 whose groove width is increased from the axially outer portion 29 toward the axially inside.

Thereby, the difference in the rigidity of the middle land portion 5 becomes small, and the uneven wear resistance can be maintained at high level.

It is preferable that the length L4 in the tire axial direction of the axially outer portion 29 is more than the length L3 in the tire axial direction of the axially inner portion 28.

Thereby, the uneven wear resistance and on-the-snow traction performance can be improved in a good balance.

In order to effectively derive such function, it is preferred that the length L4 of the axially outer portion 29 is set in a range of from 1.2 to 1.8 times the length L3 of the axially inner portion 28.

In this embodiment, the outward transverse groove 8 has a gradually widening part 31, which is disposed on the axially outside of the axially outer portion 29, whose groove width W5 is gradually increased toward the shoulder main groove 4, and which is connected to the shoulder main groove 4.

Such gradually widening part 31 can effectively discharge the snow in the outward transverse groove 8 toward the shoulder main groove 4, therefore, on-the-snow performance can be further improved.

If the groove width W5 of such gradually widening part 31 is large, the length of the groove edge 4i of the shoulder main groove 4 which edge is on the tire-equator-c-side and extends in the tire circumferential direction (circumferential component) becomes decreased, and there is a possibility that on-the-snow lateral grip performance is decreased.

Therefore, it is preferable that the groove width W5 of the gradually widening part 31 is set in a range from about 1.0 to 2.0 times the groove width W3 of the axially inner portion 28. The axial length L5 of the gradually widening part 31 is set in a range of not more than 20% of the axial length L2 of the outward transverse groove 8.

It is not essential but preferable that a width Wb of the outward transverse groove 8 averaged over the entire length is set in a range from 60% to 80% of the maximum groove width W1 of the crown main groove 3.

In this embodiment, the middle rug grooves 11 are respectively connected to the axially inner segments 26 of the shoulder main groove 4.

In this embodiment, as explained above, the outward transverse grooves 8 are connected to the axially outer segments 25 of the shoulder main groove 4, and the middle rug grooves 11 are connected to the axially inner segments 26, therefore, the variation of the rigidity of the middle land portion 5 is reduced, and the shearing force of compacted snow can be increased.

In this embodiment, one of the groove edges 11a of the middle rug groove 11 is aligned with and connected to one of the groove edges 27e of the oblique segment 27 (third oblique segment 27A) of the shoulder main groove 4.

Thereby, the middle rug groove 11 and the third oblique segment 27A are aligned like a single continuous groove, therefore, on-the-snow traction performance can be further improved. Further, as such middle rug grooves 11 can reduce the variation of the rigidity of the middle land portion 5, the uneven wear resistance can be maintained at high level.

In this embodiment, the groove width of the middle rug groove 11 is gradually increased toward the axially inner segment 26. such middle rug grooves 11 can discharge the snow therein toward the axially inner segments 26.

Figure 4:
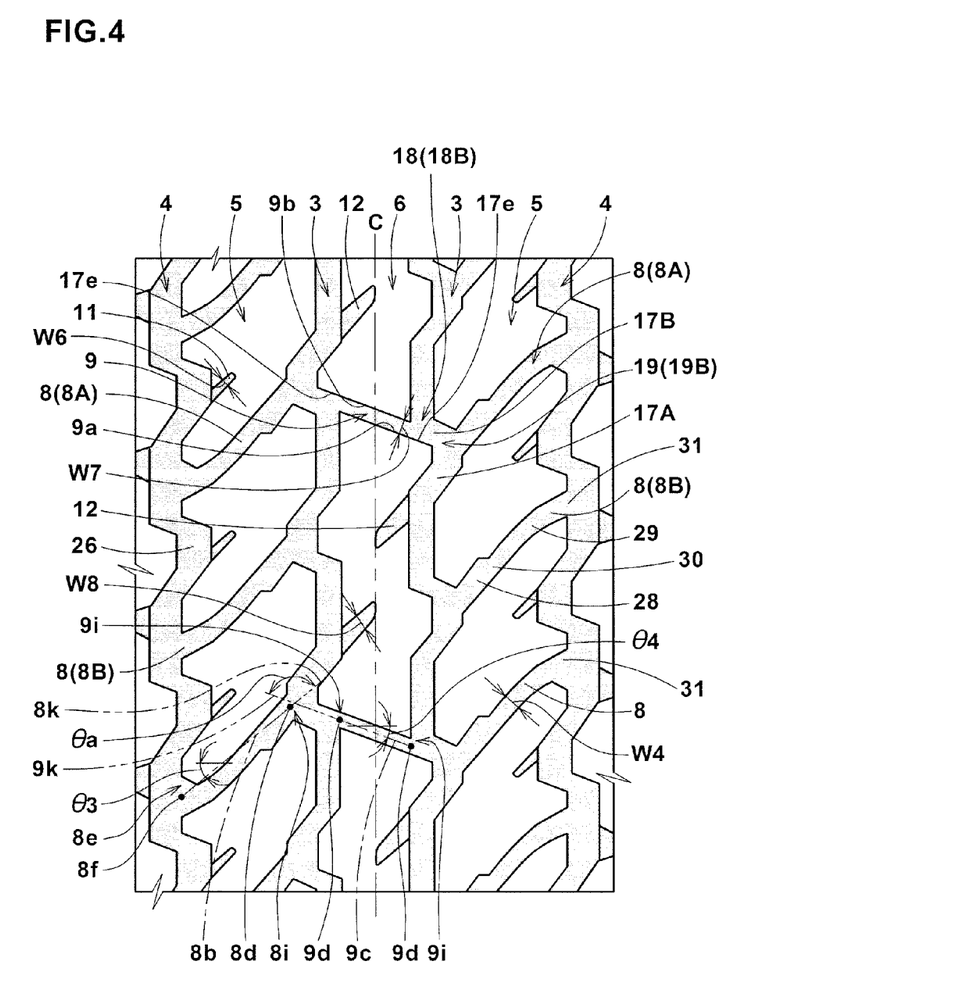
Figure 5:
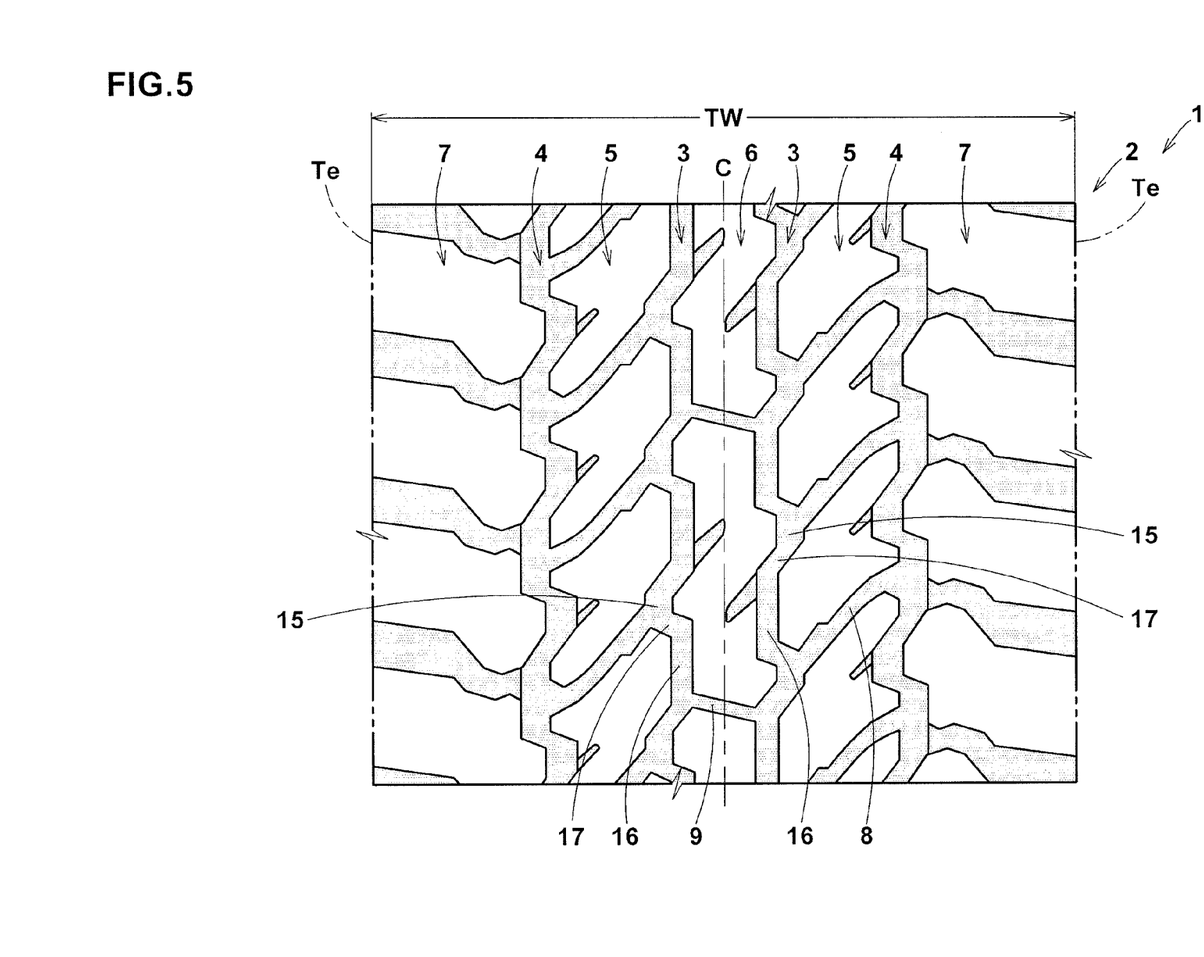
FIG. 5 is a developed view of the tread portion of another embodiment of the present invention.
Figure 6:
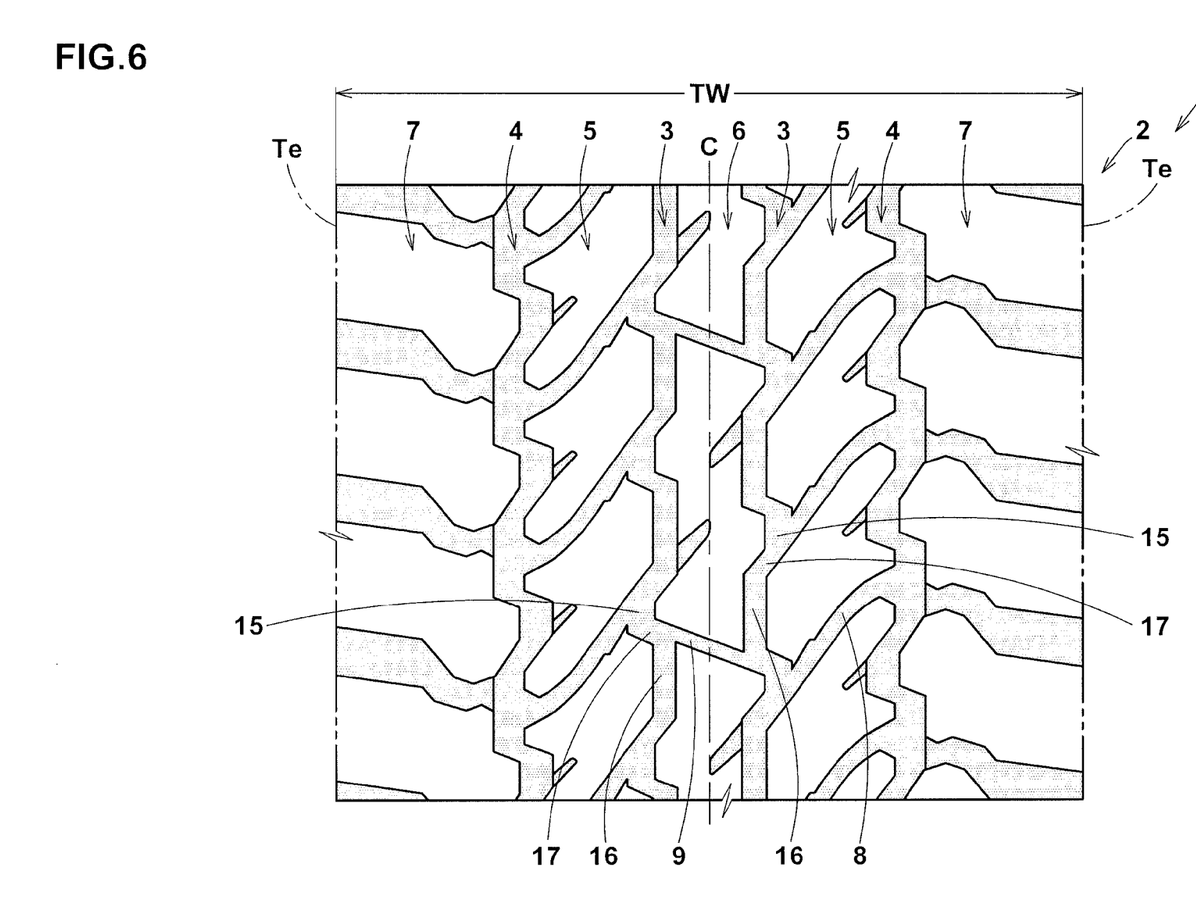
FIG. 6 is a developed view of the tread portion of a still another embodiment of the present invention.
Figure 7:
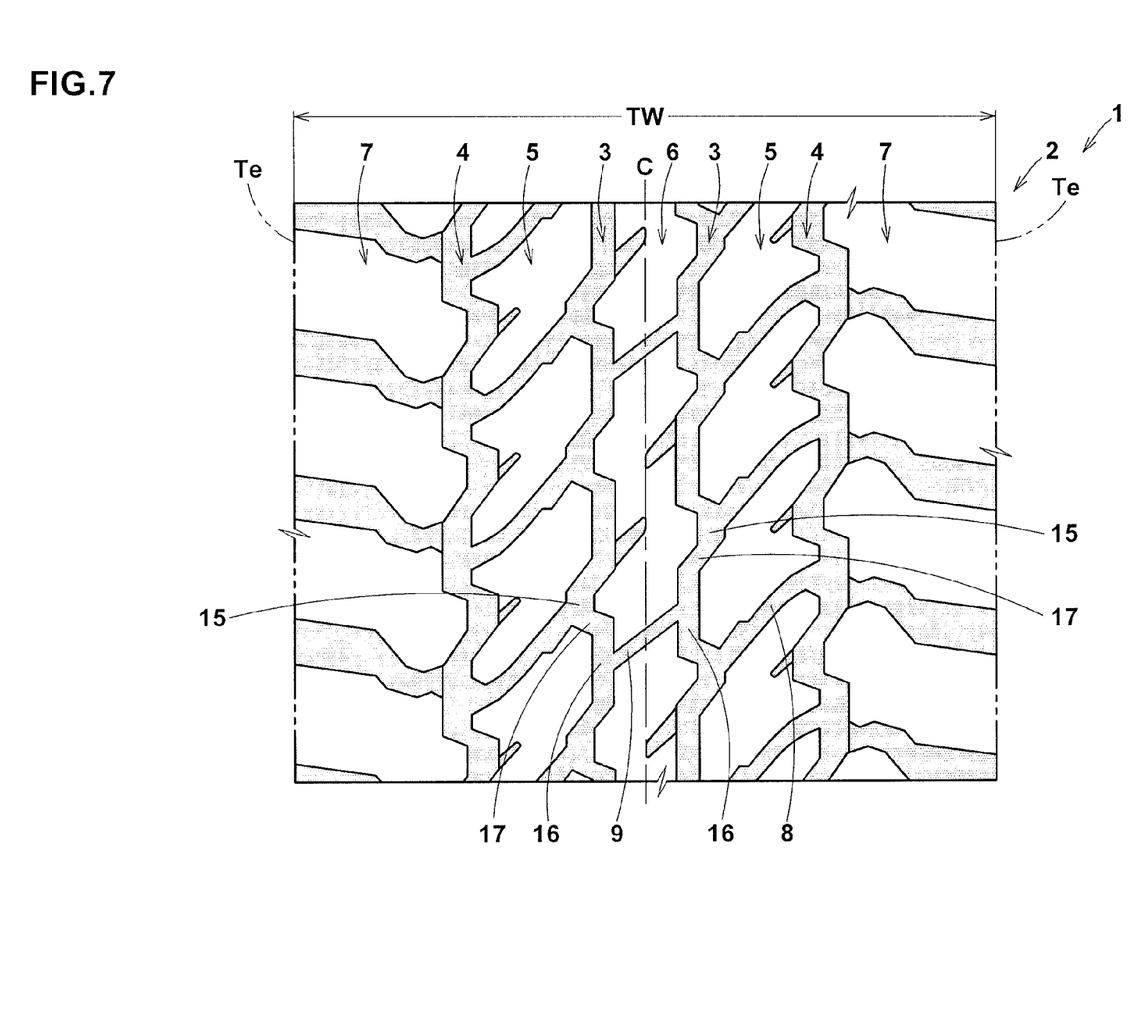
FIG. 7 is a developed view of the tread portion of Comparative example.
Figure 8:
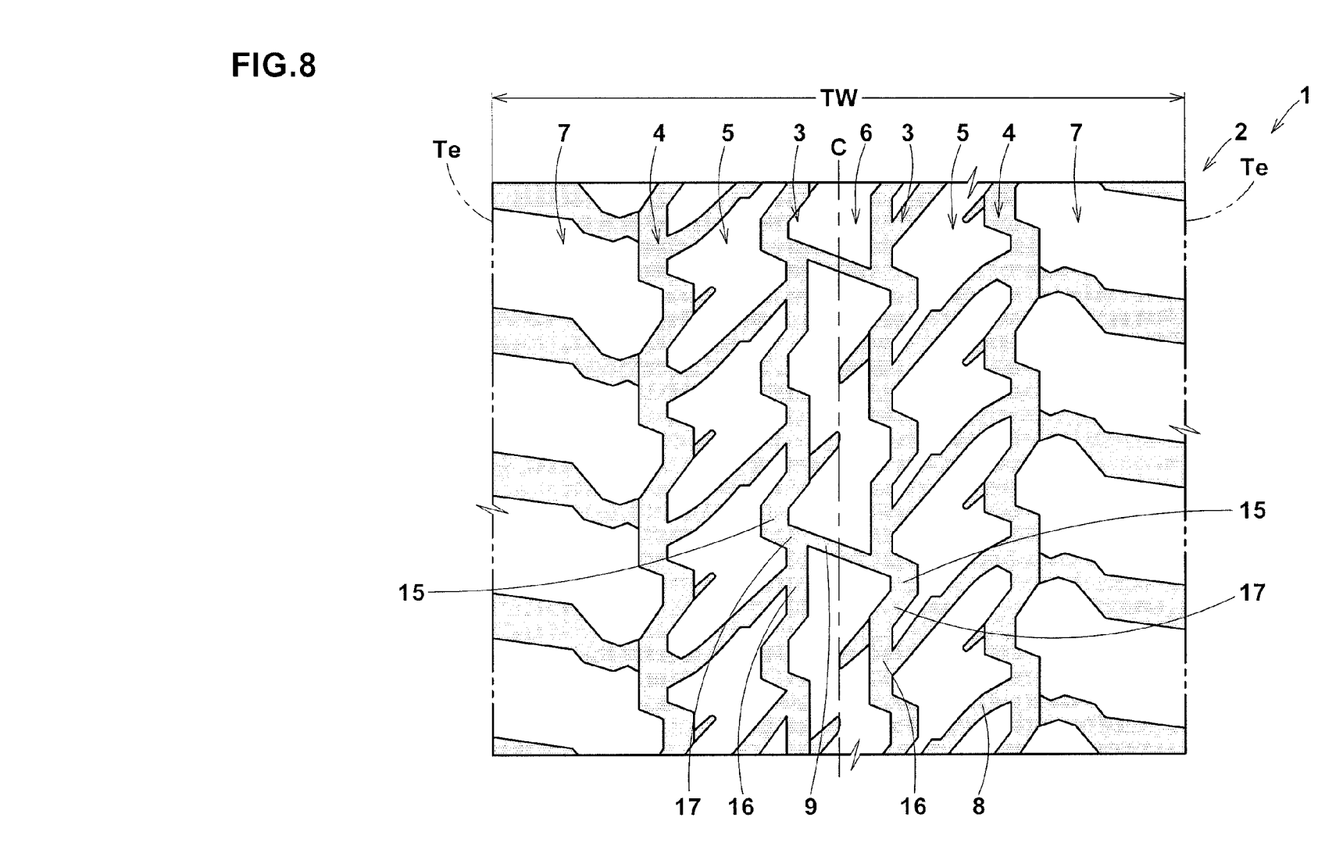
FIG. 8 is a developed view of the tread portion of another comparative example.

As shown in FIG. 4, the center land portion 6 is provided with a plurality of inward transverse grooves 9 extending axially inwardly from the crown main grooves 3, and a plurality of center rug groove 12 extending axially inwardly from the crown main grooves 3 and terminated within the center land portion 6.

As the inward transverse grooves 9 and the center rug grooves 12 each have an axial component, on-the-snow traction performance can be improved.

The inward transverse grooves 9 are connected to the axially inner intersections 18 of the crown main grooves 3. Thereby, the rigidity of the center land portion 6 near the axially inner intersections 18 can be maintained at high level, and stiffly compacted snow can be formed by the axially inner intersections 18 and the inward transverse grooves 9. Thus, on-the-snow traction performance can be further improved.

In this embodiment, the inward transverse grooves 9 are connected to the second axially inner intersections 18B.

In this embodiment, as explained above, the inward transverse grooves 9 are connected to the second axially inner intersections 18B, and the outward transverse grooves 8 are connected to second axially outer intersections 19B so that the inward transverse grooves 9 are respectively connected to the outward transverse grooves 8 through the second oblique segments 17B. Thereby, a block of compacted snow having a larger axial length is formed by an inward transverse groove 9, an outward transverse groove 8 and an second oblique segment 17B, and on-the-snow traction performance can be improved.

In this embodiment, as the outward transverse grooves 8 and the inward transverse grooves 9 on both sides of the tire equator C are connected via the oblique segments 17, larger compacted snow blocks can be obtained.

In this embodiment, the inward transverse grooves 9 are aligned with and smoothly connected to the oblique segments 17 of the crown main grooves 3.

More specifically, each of the groove edges 9a and 9b of each of the inward transverse grooves 9 is aligned with and connected to one of the groove edges 17e of one of the oblique segments 17 of one of the crown main grooves 3. Thereby, the rigidity of the center land portion 6 can be maintained at high level, and the uneven wear resistance is improved.

In this embodiment, the groove edges 9a and 9b of the inward transverse grooves 9 and the groove edges 17e of the oblique segments 17 are straight.

The inward transverse groove 9 is a straight groove having a constant groove width W7.

Owing to such inward transverse grooves 9, the rigidity of the center land portion 6 on which a higher ground pressure acts can be maintained at high level, and the uneven wear resistance can be improved.

In order to effectively derive such function, it is preferred that the groove width W7 is less than the groove width W4 of the axially outer portion 29 of the outward transverse groove 8. It is especially preferable that the groove width W7 is 50% to 70% of the maximum groove width W1 of the crown main groove 3.

In this embodiment, the inward transverse grooves 9 are inclined oppositely to the outward transverse grooves 8. Thus, the frictional force caused by the axial edge component of the inward transverse grooves 9 and the frictional force caused by the axial edge component of the outward transverse grooves 8 are in the opposite directions and can be canceled each other. Thereby, the traction performance and lateral grip performance on the snowy roads can be significantly improved.

It is preferable that an intersecting angle θa between the outward transverse groove 8 and the inward transverse groove 9 is set in a range of from 100 to 130 degrees.

Here, the intersecting angle θa means an intersecting angle between an extension 8k of the outward transverse groove 8 and an extension 9k of the inward transverse groove 9.

The extension 8k of the outward transverse groove 8 is a line smoothly extended axially inwardly from an imaginary center line 8b passing through the intermediate position 8d in the tire circumferential direction of the inner end 8i of the outward transverse groove 8 and the intermediate position 8f in the tire circumferential direction of the outer end 8e of the outward transverse groove 8.

The extension 9k of the inward transverse groove 9 is a line smoothly extended from a groove center line 9c passing through the intermediate positions 9d in the tire circumferential direction of both ends 9i of the inward transverse groove 9.

If the intersecting angle θa is less than 100 degrees, corner portions of the center land portion 6 formed between the crown main grooves 3 and the inward transverse grooves 9, and corner portions of the middle land portion 5 formed between the crown main groove 3 and the outward transverse grooves 8 are decreased in the rigidity, and there is a possibility that the uneven wear resistance is deteriorated. If the intersecting angle θa is more than 130 degrees, the frictional force caused by the circumferential component of the edges of the transverse grooves 8, 9 becomes decreased, and there is a possibility that on-the-snow lateral grip performance is deteriorated.

In this embodiment, the angle θ4 of the groove center line 9c of the inward transverse groove 9 with respect to the tire axial direction is less than the angle θ3 of the imaginary center line 8b of the outward transverse groove 8 with respect to the tire axial direction.

Thereby, in the center land portion 6 which is subjected to a higher ground pressure, the shearing force of compacted snow is increased by the axial component of the inward transverse grooves 9, on-the-snow traction performance can be significantly improved.

Further, in the middle land portion 5 subjected to a larger lateral force, as the frictional force caused by the circumferential component of the edges of the outward transverse grooves 8 is increased, on-the-snow lateral grip performance can be significantly improved.

Therefore, the angle θ4 of the inward transverse groove 9 is preferably 10 to 30 degrees, and the angle θ3 of the outward transverse groove 8 is preferably 30 to 60 degrees.

The number of the inward transverse grooves 9 is less than the number of the outward transverse grooves 8. Thereby, the rigidity of the center land portion 6 on which a higher ground pressure acts can be maintained at high level, and the uneven wear resistance can be further improved.

In this embodiment, the outward transverse grooves 8 include first outward transverse grooves 8A connected to the inward transverse grooves 9 through the oblique segments 17 of the crown main grooves 3, and second outward transverse grooves 8B not connected to the inward transverse grooves 9 through the oblique segments 17 of the crown main grooves 3.

In this embodiment, the center rug groove 12 extends along the longitudinal direction of the first oblique segment 17A of the crown main groove 3.

Thus, the center rug groove 12 and the first oblique segment 17A form a long continuous groove. Thereby, a larger shearing force of compacted snow can be obtained.

It is preferable that the groove width W8 of the center rug groove 12 is more than the groove width W6 of the middle rug groove 11.

Thereby, a larger block of stiffly compacted snow is formed by the center rug grooves 12 of the center land portion 6 on which a higher ground pressure acts. Thus, excellent on-the-snow traction performance can be obtained.

From this standpoint, it is preferable that the groove width W8 of the center rug groove 12 is preferably set in a range of from 1.5 to 3.0 times the groove width W6 of the middle rug groove 11.

As shown in FIG. 1, the shoulder land regions 7 are provided with a plurality of shoulder transverse grooves 10 extending from the shoulder main grooves 4 to the tread edges Te. Such shoulder transverse grooves 10 each have an axial component, and improve on-the-snow traction performance.

In this embodiment, the shoulder transverse groove 10 extends zigzag in the tire axial direction. The edges of such shoulder transverse groove 10 have a circumferential component, and improve on-the-snow lateral grip performance.

In this embodiment, the shoulder transverse groove 10 comprises a first groove section 10A connected to the shoulder main groove 4, and a second groove section 10B extending from the first groove section 10A to the tread edge Te.

The first groove section 10A is connected to the axially outer segment 25 of the shoulder main groove 4.

The first groove section 10A is provided at its intermediate position in the tire axial direction with a minimum width part 10d in which the groove width becomes minimum.

In such first groove section 10A, at the minimum width part 10d, the ground pressure increases, and the shearing force of compacted snow becomes increased.

Both groove edges 10e of the second groove section 10B extend toward the tread edge Te while being bent or inclined with respect to the tire axial direction toward one circumferential direction (in FIG. 1, toward the upper left). In such second groove section 10B, as the frictional force caused by the edges' circumferential component is increased, on-the-snow lateral grip performance is improved.

While detailed description has been made of an embodiment of the present invention, the present invention can be embodied in various forms without being limited to the illustrated embodiment.

Comparison Tests

Based on the tread pattern shown in FIG. 1, pneumatic tires of size 265/70R17 (rim size 17X7.5JJ) having specifications listed in Table 1 were experimentally manufactured, and tested for the on-the-snow performance and uneven wear resistance.
Common specifications are as follows.
- tire pressure: 240 kPa
- crown main groove depth: 11.0 mm
- shoulder main groove depth: 11.0 mm
- outward transverse groove depth: 11.0 mm
- inward transverse groove depth: 11.0 mm
- inward transverse groove angle θ4: 20 degrees with respect to the tire axial direction <On-the-Snow Lateral Grip Performance Test>

During a 4300CC 4WD passenger car provided on all wheels with the same test tires was running on a road surface in a test course covered with compacted snow, the test driver evaluated on-the-snow lateral grip performance based on lateral stiffness (rigidity) during cornering.
The results are indicated in Table 1 by an index based on comparative example Ref. 1 being 100, wherein the larger the value, the better the performance.

<On-the-Snow Traction Performance Test>

Further, the running distance of the test car required to accelerate from 10 km/h to 35 km/h on the road surface covered with compacted snow, was measured, and its inverse is indicated in Table 1 by an index based on comparative example Ref. 1 being 100, wherein the larger the value, the better the performance.

<Uneven Wear Resistance Test>

The test car was run on a dry asphalt pavement for 20000 Km. Then, at five different circumferential positions, the difference in the amount of wear between both edges of the inward transverse groove, and the difference in the amount of wear between both edges of the outward transverse groove were measured, and their mean value was obtained. The results are indicated in Table 1, wherein the smaller the value, the better the amount of uneven wear.

TABLE 1

| Tire | Ref. 1 | Ref. 2 | Ex. 1 | Ex. 2 | Ex. 3 | Ex. 4 | Ex. 5 |
|---|---|---|---|---|---|---|---|
| tread portion (FIG. No.) | 7 | 8 | 1 | 1 | 1 | 1 | 1 |
| crown main groove amplitude ratio V1/W1(%) | 90 | 90 | 90 | 70 | 80 | 100 | 110 |
| shoulder main groove amplitude ratio V2/W2(%) | 75 | 75 | 75 | 75 | 75 | 75 | 75 |
| intersecting angle θa(deg.) | 115 | 115 | 115 | 115 | 115 | 115 | 115 |
| inclination angle θ3(deg.) | 45 | 45 | 45 | 45 | 45 | 45 | 45 |
| groove width ratio W3/W4(%) | 150 | 150 | 150 | 150 | 150 | 150 | 150 |
| groove width ratio W7/W1(%) | 60 | 60 | 60 | 60 | 60 | 60 | 60 |
| on-the-snow traction performance | 100 | 105 | 120 | 113 | 117 | 122 | 123 |
| on-the-snow lateral grip performance | 100 | 100 | 110 | 112 | 111 | 109 | 107 |
| uneven wear resistance | 3.0 | 3.3 | 1.8 | 1.6 | 1.7 | 2.0 | 2.2 |

| Tire | Ex. 6 | Ex. 7 | Ex. 8 | Ex. 9 | Ex. 10 | Ex. 11 | Ex. 12 |
|---|---|---|---|---|---|---|---|
| tread portion (FIG. No.) | 1 | 1 | 1 | 1 | 1 | 1 | 1 |
| crown main groove amplitude ratio V1/W1(%) | 90 | 90 | 90 | 90 | 90 | 90 | 90 |
| shoulder main groove amplitude ratio V2/W2(%) | 75 | 75 | 75 | 75 | 75 | 75 | 75 |
| intersecting angle θa(deg.) | 90 | 100 | 130 | 140 | 115 | 115 | 115 |
| inclination angle θ3(deg.) | 70 | 60 | 30 | 20 | 45 | 45 | 45 |
| groove width ratio W3/W4(%) | 150 | 150 | 150 | 150 | 130 | 140 | 160 |
| groove width ratio W7/W1(%) | 60 | 60 | 60 | 60 | 60 | 60 | 60 |
| on-the-snow traction performance | 115 | 118 | 121 | 122 | 115 | 118 | 121 |
| on-the-snow lateral grip performance | 114 | 112 | 110 | 106 | 110 | 110 | 110 |
| uneven wear resistance | 2.1 | 1.9 | 1.9 | 1.8 | 1.7 | 1.8 | 1.9 |

| Tire | Ex. 13 | Ex. 14 | Ex. 15 | Ex. 16 | Ex. 17 | Ex. 18 | Ex. 19 |
|---|---|---|---|---|---|---|---|
| tread portion (FIG. No.) | 1 | 1 | 1 | 1 | 1 | 5 | 6 |
| crown main groove amplitude ratio V1/W1(%) | 90 | 90 | 90 | 90 | 90 | 90 | 90 |
| shoulder main groove amplitude ratio V2/W2(%) | 75 | 75 | 75 | 75 | 75 | 75 | 75 |

TABLE 1-continued

| | | | | | | | |
|---|---|---|---|---|---|---|---|
| intersecting angle θa(deg.) | 115 | 115 | 115 | 115 | 115 | 115 | 115 |
| inclination angle θ3(deg.) | 45 | 45 | 45 | 45 | 45 | 45 | 45 |
| groove width ratio W3/W4(%) | 170 | 150 | 150 | 150 | 150 | 150 | 150 |
| groove width ratio W7/W1(%) | 60 | 40 | 50 | 70 | 80 | 60 | 60 |
| on-the-snow traction performance | 123 | 115 | 118 | 121 | 123 | 117 | 118 |
| on-the-snow lateral grip performance | 110 | 110 | 110 | 110 | 110 | 110 | 110 |
| uneven wear resistance | 2.1 | 1.7 | 1.8 | 1.9 | 2.1 | 1.8 | 1.8 |

From the test results, it was confirmed that, according to the present invention, it is possible to improve on-the-snow performance.

REFERENCE SIGNS LIST 1 tire
2 tread portion
3 crown main groove
8 outward transverse groove
9 inward transverse groove
15 axially outer segment
16 axially inner segment
17 oblique segment
18 axially inner intersection
19 axially outer intersection
C tire equator

The invention claimed is:

1. A tire, comprising:
a tread portion provided with main grooves including a pair of axially innermost crown main grooves extending continuously in the tire circumferential direction;
a plurality of outward transverse grooves extending axially outwardly from each of the crown main grooves; and
a plurality of inward transverse grooves extending axially inwardly from each of the crown main grooves,
wherein each of the crown main grooves is a zigzag groove comprising:
a plurality of axially outer segments extending along the tire circumferential direction,
a plurality of axially inner segments extending along the tire circumferential direction on the axially inner side of the axially outer segments, and
a plurality of oblique segments inclined with respect to the tire circumferential direction and linking the axially outer segments and the axially inner segments,
wherein each of the inward transverse grooves is connected to one of axially inner intersections of the axially inner segments and the oblique segments,
wherein each of the outward transverse grooves is connected to one of axially outer intersections of the axially outer segments and the oblique segments,
wherein each of the inward transverse grooves extends from a first of the crown main grooves to a second of the crown main grooves, and
wherein the number of the inward transverse grooves is smaller than the number of said plurality of axially outer segments.

2. The tire according to claim 1, wherein each of the inward transverse grooves is smoothly connected to one of the oblique segments of the first crown main groove and one of the oblique segments of the second crown main groove such that two opposite groove edges of the inward transverse groove are respectively aligned with and connected to one of two opposite groove edges of the one of the oblique segments of the first crown main groove and one of two opposite groove edges of the one of the oblique segments of the second crown main groove.

3. The tire according to claim 1, wherein the inward transverse grooves are straight grooves.

4. The tire according to claim 1, wherein each of the outward transverse grooves comprises:
an axially inner portion connected to one of the crown main grooves, and
an axially outer portion located axially outside the axially inner portion,
wherein the axially outer portion is curved, and
wherein the groove width of the axially inner portion is more than the groove width of the axially outer portion.

5. The tire according to claim 1, wherein the outward transverse grooves are inclined oppositely to the inward transverse grooves,
wherein a first extension of the outward transverse groove and a second extension of the inward transverse groove intersect with each other at an intersecting point,
wherein the first extension is a line extended axially inwardly from an imaginary center line extending straight between respective intermediate positions in the tire circumferential direction of both ends of the outward transverse groove,
wherein the second extension is a line extended from a groove center line extending straight between respective intermediate positions in the tire circumferential direction of both ends of the inward transverse groove,
wherein an intersecting angle is an angle formed between the first extension and the second extension at the intersecting point, and
wherein the intersecting angle is in a range from 100 to 130 degrees.

6. The tire according to claim 5, wherein an angle of the groove center line of the inward transverse groove with respect to a tire axial direction is less than an angle of the imaginary center line of the outward transverse groove with respect to the tire axial direction.

7. The tire according to claim 1, wherein the main grooves include a pair of axially outermost shoulder main grooves, and
wherein each of the shoulder main grooves is a zigzag groove comprising:
a plurality of axially outer segments extending along the tire circumferential direction,
a plurality of axially inner segments extending along the tire circumferential direction on the axially inner side of the axially outer segments, and
a plurality of oblique segments inclined with respect to the tire circumferential direction and linking the axially outer segments and the axially inner segments.

8. The tire according to claim 7, wherein the outward transverse grooves of the crown main grooves are respectively connected to the axially outer segments of the shoulder main grooves.

* * * * *